(12) United States Patent
Jiang et al.

(10) Patent No.: US 9,475,241 B2
(45) Date of Patent: Oct. 25, 2016

(54) INFLATABLE MEMBRANE APPARATUS AND PROCESS FOR TRANSFERRING A COATING ONTO A SURFACE OF A LENS BLANK

(75) Inventors: Peiqi Jiang, St. Petersburg, FL (US); Fadi O. Adileh, St. Petersburg, FL (US); Yassin Yusef Turshani, St. Petersburg, FL (US)

(73) Assignee: ESSILOR INTERNATIONAL COMPAGNIE GENERALE D'OPTIQUE, Charenton-le-Pont (FR)

( * ) Notice: Subject to any disclaimer, the term of this patent is extended or adjusted under 35 U.S.C. 154(b) by 1490 days.

(21) Appl. No.: 12/247,627

(22) Filed: Oct. 8, 2008

(65) Prior Publication Data
US 2009/0092751 A1  Apr. 9, 2009

Related U.S. Application Data (63) Continuation-in-part of application No. 10/482,722, filed as application No. PCT/EP02/07239 on Jul. 1, 2002, now Pat. No. 7,455,796, which is a continuation-in-part of application No. 09/899,367, filed on Jul. 2, 2001, now Pat. No. 6,562,466.

(51) Int. Cl.
*B29D 11/00* (2006.01)
*B29C 63/16* (2006.01)
(Continued)

(52) U.S. Cl.
CPC ........... *B29D 11/0073* (2013.01); *B29C 63/16* (2013.01); *B29C 63/22* (2013.01); *B29C 65/1406* (2013.01); *B29C 65/1435* (2013.01);
(Continued)

(58) Field of Classification Search
USPC .................. 264/1.1, 1.7, 2.7, 313, 314, 315; 425/808, 389
IPC .............. B29D 11/0073; B29C 65/1435,63/16, B29C 65/1406, 65/4845, 63/22, 65/1483, B29C 66/80, 65/483
See application file for complete search history.

(56) References Cited

U.S. PATENT DOCUMENTS 3,010,692 A * 11/1961 Jentoft .......................... 251/61.1
4,061,518 A    12/1977 Burroughs et al. ........... 156/232
(Continued)

FOREIGN PATENT DOCUMENTS

EP        0404111        6/1990
EP        0614957        9/1997
(Continued)

OTHER PUBLICATIONS

International Search Report issued in International Application No. PCT/EP02/07239, mailed Feb. 20, 2003.
(Continued)

*Primary Examiner* — Mathieu Vargot
(74) *Attorney, Agent, or Firm* — Norton Rose Fulbright US LLP (57) ABSTRACT

An inflatable membrane apparatus (10) comprising (a) a fluid accumulator (11) having an upper and a lower face and a fluid entrance (12), said lower face being partly formed by an inflatable membrane (14), and (b) a trunconical part (15) projecting outwardly from the lower face of the accumulator whose greater base is closed by at least part of the inflatable membrane (14) and smaller base forms a circular opening, whereby, when pressurized fluid is introduced into the accumulator (11), deformation of the inflatable membrane (14) is guided by the trunconical part.

20 Claims, 3 Drawing Sheets

(51) Int. Cl.
| | |
|---|---|
| B29C 63/22 | (2006.01) |
| B29C 65/14 | (2006.01) |
| B29C 65/48 | (2006.01) |
| B29C 65/00 | (2006.01) |
| B29C 65/52 | (2006.01) |
| B29C 35/08 | (2006.01) |
| B29C 63/48 | (2006.01) |
| B29K 669/00 | (2006.01) |
| B29L 11/00 | (2006.01) |

(52) U.S. Cl.
CPC ......... *B29C 65/1483* (2013.01); *B29C 65/483* (2013.01); *B29C 65/4845* (2013.01); *B29C 65/52* (2013.01); *B29C 66/301* (2013.01); *B29C 66/545* (2013.01); *B29C 66/73161* (2013.01); *B29C 66/80* (2013.01); *B29C 66/81267* (2013.01); *B29C 66/81422* (2013.01); *B29C 66/81423* (2013.01); *B29C 66/81455* (2013.01); *B29C 66/83221* (2013.01); *B29C 65/4835* (2013.01); *B29C 65/4865* (2013.01); *B29C 66/452* (2013.01); *B29C 66/71* (2013.01); *B29C 66/7315* (2013.01); *B29C 66/7338* (2013.01); *B29C 66/7352* (2013.01); *B29C 66/73921* (2013.01); *B29C 66/8122* (2013.01); *B29C 66/81264* (2013.01); *B29C 2035/0827* (2013.01); *B29C 2063/485* (2013.01); *B29K 2669/00* (2013.01); *B29K 2869/00* (2013.01); *B29K 2995/007* (2013.01); *B29K 2995/0027* (2013.01); *B29K 2995/0072* (2013.01); *B29K 2995/0089* (2013.01); *B29L 2011/0016* (2013.01); *Y10T 156/1744* (2015.01); *Y10T 428/31507* (2015.04)

(56) References Cited

U.S. PATENT DOCUMENTS

| | | | |
|---|---|---|---|
| 4,064,518 A | 12/1977 | Douglas | 354/86 |
| 4,927,480 A | 5/1990 | Vaughan | 156/228 |
| 5,512,371 A | 4/1996 | Gupta et al. | 428/412 |
| 5,851,328 A | 12/1998 | Kohan | 156/102 |
| 6,242,065 B1 | 6/2001 | Blomberg et al. | 428/64.1 |
| 6,355,124 B1 | 3/2002 | Blomberg et al. | 156/99 |
| 6,562,466 B2 | 5/2003 | Jiang et al. | 428/412 |

FOREIGN PATENT DOCUMENTS

| | | |
|---|---|---|
| EP | 0796719 | 9/1997 |
| EP | 1161512 | 2/2004 |
| EP | 1426168 | 2/2005 |
| JP | 63-087223 | 4/1988 |
| JP | 63-141001 | 6/1988 |
| JP | 08-090665 | 4/1996 |
| JP | 09-197107 | 7/1997 |
| JP | 2000-009905 | 1/2000 |
| WO | WO 93/21010 | 10/1993 |
| WO | WO 94/10230 | 5/1994 |
| WO | WO 95/13904 | 5/1995 |
| WO | WO 97/35216 | 9/1997 |
| WO | WO 99/24243 | 5/1999 |
| WO | WO 99/29494 | 6/1999 |
| WO | WO 03/004255 | 1/2003 |

OTHER PUBLICATIONS

Office Action issued in U.S. Appl. No. 09/899,367, mailed Sep. 16, 2002.
Office Action issued in U.S. Appl. No. 10/437,272, mailed Feb. 15, 2005.
Office Action issued in U.S. Appl. No. 10/437,272, mailed Oct. 3, 2005.
Office Action issued in U.S. Appl. No. 10/482,722, mailed Jun. 14, 2007.
Office Action issued in U.S. Appl. No. 10/482,722, mailed Oct. 26, 2007.
Office Communication issued in Japanese Application No. JP 2003-510246, mailed Jul. 10, 2007.
Owens, et al., "Estimation of the surface force energy of polymers," *J. Appl. Polym. Sci.*, 13:1741-1747, 1969.
Sobieski et al., Handbook of Pressure-Sensitive Adhesive Technology, $2^{nd}$ ed., D. Satas, ed. pp. 508-517, 1982.

* cited by examiner

INFLATABLE MEMBRANE APPARATUS AND PROCESS FOR TRANSFERRING A COATING ONTO A SURFACE OF A LENS BLANK

CROSS REFERENCES TO RELATED APPLICATIONS

This application is a continuation-in-part of U.S. application Ser. No. 10/482,722, filed 2 Jan. 2004, now U.S. Pat. No. 7,455,796, which is a national phase application under 35 U.S.C. §371 of PCT Application No. PCT/EP02/07239 filed 1 Jul. 2002, which claims priority to U.S. application Ser. No. 09/899,367 filed 2 Jul. 2001 now U.S. Pat. No. 6,562,466. The contents of these application are incorporated by reference.

BACKGROUND OF THE INVENTION

The present invention relates to an improved inflatable membrane apparatus and a process or method for transferring a coating onto at least one surface of a lens blank which can be implemented in a short period of time without any risk of deformation of the lens blank.

It is a common practice in the art to coat at least one face of an ophthalmic lens with several coatings for imparting to the finished lens additional or improved optical or mechanical properties.

Thus, it is usual practice to coat at least one face of an ophthalmic lens, typically made of an organic glass material, with successively, starting from the face of the lens, an impact resistant coating (impact resistant primer), a scratch resistant coating (hard coat), an anti-reflecting coating and, optionally, a hydrophobic top coat. Other coatings such as polarized coating, photochromic or dyeing coating may also be applied onto one or both faces of the ophthalmic lens.

Numerous processes and methods have been proposed for coating a face of an ophthalmic lens.

U.S. Pat. No. 4,061,518 discloses a process for fabricating an article having a replicated coating with a durable dielectric overcoat thereon which comprises forming onto an optically polished surface of a master a release layer, a protective coat and a reflective coat, applying a pre-measured amount of an epoxy resin adhesive on a face of a support member of casting, and thereafter transferring the coating from the master to the support member of casting by applying the coating face of the master to the epoxy resin adhesive, curing the epoxy resin adhesive under heat and withdrawing the master. The support member of casting is preferably an aluminium casting. The described method is particularly suited for making mirrors.

WO 99/24243 discloses a method of making a thermoplastic lens by placing a laminated layer/coating having the desired lens characteristics required for the prescription between a preheated lens blank and preheated mold halves and pressing the mold halves toward each other to compress the lens blank and uniformly apply the layer/coating thereon without any creases or cracks therein.

In this method, the lens molds are pressed toward each other and against the lens blank to immediately size down the lens blank and any laminations included therewith to its finished lens size with the desired layer coatings in a few minutes. In fact, the lens blank and juxtaposed laminations are compressed at a predetermined programmed rate of speed, whereby the lens blank is compressed and spread out into the mold cavity with a layer/coating uniformly applied thereon.

In order to obtain the required geometry for the final lens, spreading of the blank must be carefully controlled and therefore heating and compression have also to be carefully controlled.

U.S. Pat. No. 5,512,371 discloses a composite plastic optical quality lens, comprising a plastic lens preform of optical quality material, and a cured plastic attached portion that is bonded to said plastic lens preform portion; said cured plastic attached portion having higher scratch resistance, and lower chromatic aberration than said plastic lens preform.

Such a lens is obtained by pouring a lens composition in a molding cavity delimited by a mold part and a lens preform and then curing said lens composition.

According to one preferred embodiment of U.S. Pat. No. 5,512,371, coatings may be provided on the resultant lens by transferring coatings from the mold to the resultant lens.

The purpose of U.S. Pat. No. 5,512,371 is to substantially modify and improve the mechanical properties of the plastic lens preform, generally made of bisphenol-A polycarbonate. In particular, properties such as edging and chromatic aberration of the whole resultant lens are supposed to be significantly modified by the cured attached portion. Such results are achievable only for cured attached portions having a thickness globally in the same range or even higher than the thickness of the preform, taking into account that the usual center thickness of the final resultant lens is generally, as known in the art, of more than 1 mm.

If it was not the case, the modifications brought by the cured portion would have no significant effects on the properties of the composite lens such as chromatic aberration and edging.

WO 93/21010 also relating to the manufacture of composite lenses gives a minimum thickness for the preform: 100 microns, with typical thickness of 0.5 to 1.5 mm.

In general, it is difficult to manufacture and handle preforms that are less than 500 microns thickness.

Based on the above elements, it is clear that thicknesses for the cured attached portion of U.S. Pat. No. 5,512,371, even if not specifically mentioned, are typically around 0.5 mm or above.

According to the method of manufacture described in U.S. Pat. No. 5,512,371, a resin is poured in a mold and a lens polycarbonate preform is placed on the top of the resin filled mold, slight pressure is applied to squeeze out excess resin until a carrier of sufficient thickness is obtained.

The assembly lens/preform/mold part is held together with the capillary action of the resin material and the weight of the lens preform.

WO 97/35216 discloses a process for transferring a multilayer coating onto the surfaces of a lens which comprises:
  providing a thin polymeric film substrate which is flexible and extensible and having one face coated with the transferable multilayer coating;
  placing the coated film substrate in an apparatus including a film deforming member;
  disposing a drop of an adhesive between the film substrate and a lens surface;
  urging the film into conforming engagement with a surface of the lens; and
  curing to adhere the multilayer coating on the lens surface.

In this process, the film substrate is stretched to conform to the surface of the lens, thereby stretching the multilayer coating. Stretching shall in fact be avoided because it entails a high risk of tearing and/or cracking the layers of the multilayer coating, in particular mineral layers such as conventional antireflective layers.

SUMMARY OF THE INVENTION

It is an object of the present invention to provide an inflatable membrane apparatus for use in a process or a method for transferring a coating from a support onto at least one surface of a lens blank which does not entail any deformation of the lens blank and the use of specific mold parts, for each prescribed final lens geometry.

It is an additional object of this invention to provide a process or a method for transferring a coating from a support onto at least one surface of a lens blank using the above membrane inflatable apparatus.

In accordance with the above objects and those that will be mentioned and will become apparent below, there is provided according to the invention an inflatable membrane apparatus comprising:

- a fluid accumulator having an upper and a lower face and a fluid entrance, said lower face being partly formed by an inflatable membrane, and
- a trunconical part projecting outwardly from the lower face of the accumulator whose greater base is closest by at least part of the inflatable membrane and smaller base forms a circular opening,
- whereby, when pressurized fluid is introduced into the accumulator deformation of the inflatable membrane is guided by the trunconical part.

The invention also concerns a process or method for transferring a coating from at least one support onto at least a geometrically defined surface of a lens blank using the inflatable membrane apparatus of the invention which comprises:

- providing a lens blank having at least one geometrically defined surface;
- providing a flexible support having an internal surface bearing a coating and an external surface;
- depositing on said geometrically defined surface of said lens blank or on said coating a pre-measured amount of curable glue;
- moving relatively to each other the lens blank and the support to either bring the coating into contact with curable glue or bring the curable glue into contact with the geometrically defined surface of the lens blank, thus forming an assembly comprising the lens blank, the curable glue and the coated support;
- placing the assembly in front of the inflatable membrane apparatus with the support facing the inflatable membrane;
- inflating the inflatable membrane for urging the flexible support against the lens blank, thereby applying a pressure onto the external surface of the support so that the thickness of a final glue layer after curing is less than 100 micrometers;
- curing the glue; and
- withdrawing the support to recover the lens blank with the coating adhered onto the geometrically defined surface of said lens blank.

By pre-measured amount, one means a sufficient amount of glue to obtain transfer and adhesion of the coating to the lens blank.

In one embodiment of the process of the invention, the pre-measured amount of the curable glue may consist in the external layer of the coating itself, in particular an impact-resistant primer layer of the coating to be transferred. This could be the case when the impact-resistant primer layer comprises UV polymerizable (meth)acrylate monomers. It can also be the anti-abrasion layer, in particular when no primer layer is to be transferred to the blank.

It also can be the external layer of an anti-reflection coating, in particular when only such an anti-reflection coating is being transferred. In that case, of course, the anti-reflection coating is deposited in a liquid form.

In another embodiment of the inventive process an adhesive primer layer may be deposited on the blank, prior to the deposition of the pre-measured amount of the curable glue.

Of course, the pre-measured amount of curable glue can be deposited in any appropriate form such as in the form of a drop or of a layer.

By geometrically defined surface of the lens blank or of a mold part, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ µm to 2 µm, preferably from $10^{-3}$ µm to 1 µm, more preferably from $10^{-3}$ to 0.5 µm and most preferably from $10^{-3}$ to 0.1 µm.

By optical surface, there is meant a surface of the lens blank or of a mold part that has been ground, fined and polished or molded to required geometry and smoothness.

An important feature of the process of the present invention is that the transfer of the coating onto the geometrically defined surface of the lens blank is performed without any substantial compression of the blank and thus without any risk of deformation of the blank geometry and in particular of the geometrically defined surfaces thereof.

Nevertheless, the pressure exerted on the external surface of the support is preferably substantially maintained at least up to the gelling of the glue. Maintaining the pressure is effected through the use of an inflatable membrane placed on the external surface of the support.

Preferably, the applied pressure ranges from 5 to 50 Psi (0.35 to 3.5 kgf/cm²), and more specifically 0.3 to 3 kgf/cm². A more preferred range is 5 to 30 Psi, and a most preferred range is 5 to 20 Psi (0.35 to 1.40 kgf/cm²).

Using the above described process, coatings may be transferred successively or simultaneously to both front and rear geometrically defined surfaces of the lens blank. The transfer of the coatings may also be performed only to one side of the lens blank, preferably to the back side (or rear side).

The flexible coating support or carrier may simply be a thin supporting film made of an appropriate material such as a plastic material, for example a polycarbonate film. The coating support is preferably a mold part made of any appropriate material, preferably made of a plastic material especially a thermoplastic material and in particular of polycarbonate.

The working surface of the mold part may have a relief organized according to a pattern, in other words, may be microstructured and may confer to the final lens an optical surface having the properties imparted by the microstructure (for example anti-reflection properties).

Different techniques for obtaining a microstructured mold part are disclosed in WO99/29494.

The mold part or carrier may be obtained by using known processes such as surfacing, thermoforming, vacuum thermoforming, thermoforming/compression, injection molding, injection/compression molding.

When using a flexible mold part it is only necessary to provide the mold part with a surface the geometry of which conforms to the general shape of the optical surface of the lens blanks onto which the coating is to be transferred, either a concave or convex shape, but it is not necessary that this surface strictly corresponds to the geometry of the lens blank surface to be coated. Thus, the same mold part can be used for transferring coatings onto lens blanks having surfaces of different specific geometries. Generally, the flexible mold part has two parallel main surfaces and consequently has an even thickness.

The coating bearing surface of the flexible mold is preferably spherical.

Flexible mold parts would typically have a thickness of 0.2 to 5 mm, preferably of 0.3 to 5 mm, more preferably of 0.3 to 1 mm. More preferably, the flexible mold part is made of polycarbonate, and in this case the thickness is from 0.5 to 1 mm.

The inventors have found that the best embodiments of the invention are achieved if specific requirements regarding the base curvatures of the mold part and lens blank are fulfilled.

In this patent application, when one refers to the base curvature of the mold part, one means the base curvature of the working surface of the mold part, that is to say the surface which bears the coatings to be transferred to the lens or lens blank.

In the same way, base curvature of the lens or lens blank means the base curvature of the surface to which the coatings are going to be transferred from the above cited mold part.

In this application, the base curvature has the following definition:

For a spherical surface, having a radius of curvature R, Base curvature (or base)=530/R (R in mm); such kind of definition is quite classical in the art.

For a toric surface, there are two radii of curvature and one calculates, according to the above formula, two base curvatures BR, Br with BR<Br.

For a coating transfer to a spherical back side of a lens or lens blank, in order to avoid distortions, in particular when using a flexible mold part, the base curvature (BC) of the flexible mold part (front side) must be slightly higher than the base curvature (BL) of the geometrically defined surface of the lens or the lens blank on which the coating is to be transferred. However, BC shall not be too high in order to avoid cracking of the coating during the transfer process or an optical power outside tolerance of Z801 after the transfer.

Typically, for a spherical lens or lens blank, base curvature BL of the lens or lens blank and base curvature BC of the flexible mold part shall satisfy the relationship:

$$0 < BC - BL < 1.5$$

Preferably $$0.2 < BC - BL < 1$$

For a coating transfer to a toric back side of a lens or a lens blank (cylindrical lens or lens blank), having two principal meridians, of radii R and r with R>r, it is possible to calculate two base curvatures BLR and BLr corresponding respectively to radii R and r defining the toric surface.

Base curvatures of the lens BLR and BLr and the base curvature of the flexible mold part shall satisfy the following relationships:

$$BLR < BLr \text{ and:}$$

a) if BLr−BLR≤3.5, then 0<BC−BLR<3 and |BC−BLr|<1, preferably 0.2<BC−BLR<2.5 and |BC−BLr|<0.5.

b) if BLr−BLR>3.5, then BLR<BC<BLr.

Preferably, when moving relatively to each other the mold part and the blank, the contact between coating(s) and curable glue or between curable glue and lens blank geometrically defined surface occurs respectively in the center area of the coated mold part or in the center area of the lens blank geometrically defined surface.

In particular in the case of a flexible mold part, the convex front face of the mold part may have a shorter radius of curvature than the concave surface of the blank to be coated. Thus, pressure is applied at the center and the mold part is then deformed to conform to the blank surface. The glue layer is formed starting from the center of the blank, which avoids entrapping air bubbles within the final cured glue layer. The same will be true using the concave surface of a mold part of longer radius of curvature than a convex blank surface to be coated.

As previously mentioned, transfer from a flexible mold part is effected using an inflatable membrane.

The inflatable membrane can be made of any elastomeric material which can be sufficiently deformed by pressurization with appropriate fluid for urging the flexible mold part against the lens or lens blank in conformity with the surface geometry of the lens or the lens blank.

The inflatable membrane can be made of any appropriate elastomeric material. Typically, the inflatable membrane has a thickness ranging from 0.50 mm to 5.0 mm and an elongation of 100 to 800%, and a durometer 10 to 100 Shore A.

If the glue is thermally cured, then the material of the inflatable membrane shall be selected to bear the curing temperature.

If the glue is UV cured, then a transparent material shall be selected, for example a transparent silicone rubber or other transparent rubbers or latexes: the UV light is preferably irradiated from the mold side.

The pressure applied to the mold part by the inflatable membrane will preferably range from 30 kPa to 150 kPa and will depend on the lens or lens blank and flexible mold part sizes and curvatures. Of course, the pressure needs to be maintained onto the flexible mold part and the lens or lens blank until the glue or adhesive is sufficiently cured so that enough adhesion of the coating to the lens or lens blank is obtained.

The lens blank can be a lens having one or both of its faces surfaced or casted to the required geometry. (A lens having only one of its faces surfaced or casted to the required geometry is called a semi-finished lens).

Preferably, the lens blank has a first face conferring progressive power and a second face conferring non-progressive power, but of spherical or torical shape onto which coating transfer according to the invention process is preferably performed. Preferably, the progressive face is the front face of the blank.

The lens blank can also be a semi-finished lens wherein one face of the lens, preferably the front face of the lens has previously been treated with an appropriate coating (anti-reflection, hard coat, etc. . . . ) and the remaining face, preferably the rear face, of the lens is coated using the transfer process of the invention. The lens blank can be a polarized lens.

The lens blank can be pre-treated before applying the method of the invention.

The pre-treatment can be physical such as a plasma treatment or chemical such as a solvent treatment or a NaOH treatment.

The transferred coating may comprise any coating layer or stack of coating layers classically used in the optical field, such as an anti-reflection coating layer, an anti-abrasion coating layer, an impact resistant coating layer, a polarized coating layer, a photochromic coating layer, an optical-electronical coating, an electric-photochromic coating, a dyeing coating layer, a printed layer such as a logo or a stack of two or more of these coating layers.

According to a preferred embodiment of the invention, it is transferred to the geometrically defined surface of the lens blank a stack comprising:

optionally, a hydrophobic top coat;
an antireflection stack, generally comprising inorganic material such as metal oxide or silica;
a hard coat, preferably comprising a hydrolyzate of one or more epoxysilane(s) and one or more inorganic filler(s) such as colloidal silica;
optionally, an impact strength primer, preferably a polyurethane latex or an acrylic latex;
each of the layers of the stack being deposited onto the support in the above recited order.

The method of the invention is particularly interesting for transferring the whole stack comprising "top coat, antireflection coat, hard coat and primer coat".

Generally the thickness of the antireflection coat or stack ranges from 80 nm to 800 nm and preferably 100 nm to 500 nm.

The thickness of the hard coat preferably ranges from 1 to 10 micrometers, preferably from 2 to 6 micrometers.

The thickness of the primer coat preferably ranges from 0.5 to 3 micrometers.

Typically, the total thickness of the coating to be transferred is 1 to 500 µm, but is preferably 50 µm or less, more preferably less than 20 micrometers, or even better 10 µm or less.

The glue or adhesive may be any curable glue or adhesive, preferentially a thermally curable or photocurable, in particular room temperature or UV curable, glue or adhesive that will promote adhesion of the coating to the optical surface of the blank without impairing the optical properties of the finished lens.

Some additives such as photochromic dyes and/or pigments may be included in the glue.

Although the liquid glue or adhesive is preferably dispersed at the center, it can be dispersed in a random pattern, spread out firstly via spin coating, or sprayed using a precision dispensing valve. By even layer distribution, it is meant that the variation of thickness of the glue or adhesive layer, once cured, has no consequence on the optical power of the final lens.

The curable glue or adhesive can be polyurethane compounds, epoxy compounds, (meth)acrylate compounds such as polyethyleneglycol di(meth)acrylate, ethoxylated bisphenol A di(meth)acrylates.

The preferred compounds for the curable glue or adhesive are acrylate compounds such as polyethyleneglycoldiacrylates, ethoxylated bisphenol A diacrylates, various trifunctional acrylates such as (ethoxylated) trimethylolpropane triacrylate and tris(2-hydroxyethyl)isocyanurate.

Monofunctional acrylates such as isobornylacrylate, benzylacrylate, phenylthioethylacrylate are also suitable.

The above compounds can be used alone or in combination.

Preferably, when cured, the glue layer has an even thickness. Suitable glues are commercially available from the Loctite Company.

As previously mentioned, the thickness of the final glue layer after curing is less than 100 µm, preferably less than 80 µm, most preferably less than 50 µm and usually 1 to 30 µm.

The lens blank may be made of any material suitable for making optical lenses but is preferably made of a plastic material and in particular of diethyleneglycol bis-allylcarbonate copolymer (CR-39® from PPG INDUSTRIES), polycarbonate (PC), polyurethane, polythiourethane, episulfide ultra-high index materials, optionally containing photochromic compounds.

The final lenses obtained by the method of the invention have very good optical quality and they have no or very low level of interference fringes.

BRIEF DESCRIPTION OF THE DRAWING

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Figure 1A:
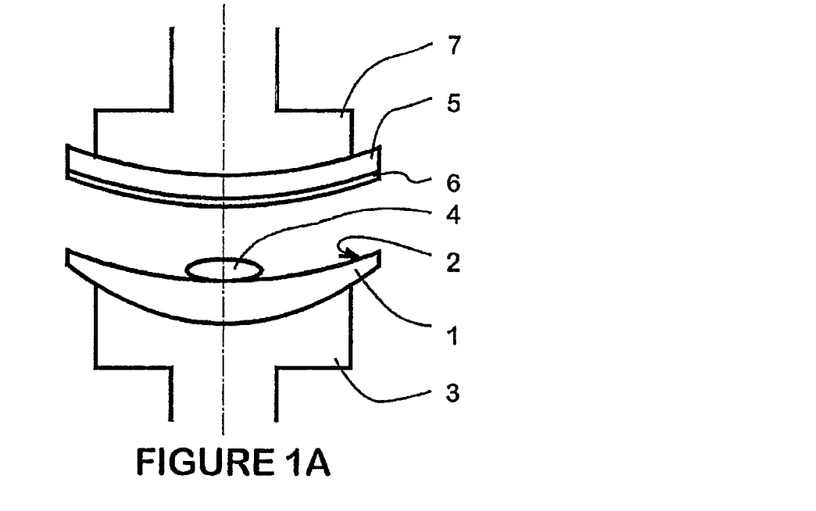
FIGS. 1A to 1C are schematic views of the main steps of a first embodiment of a process for transferring a coating onto an optical surface of a lens blank.
Figure 1B:
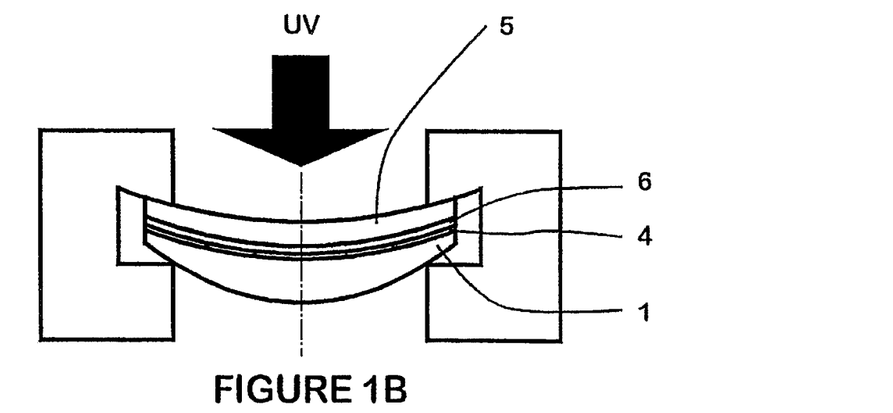
Figure 1C:
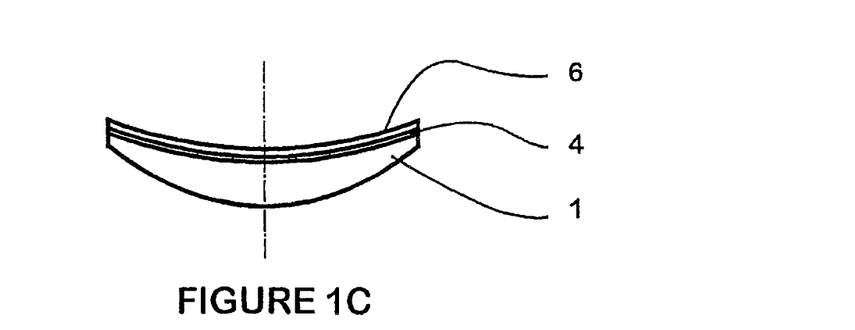

Referring now to the drawings and in particular to FIGS. 1A to 1C, a lens blank 1 having a concave surface 2 is placed on a supporting element 3 with its concave surface 2 facing upwardly. A pre-measured drop of a UV curable glue 4 is then deposited onto the surface 2 of the lens blank 1. A flexible mold part 5 having a convex optical surface, which has been previously coated with a prescribed coating 6, is placed onto a supporting element 7 with its surface bearing the optical coating facing downwardly.

Deposition of coating 6 on the surface of the flexible mold part 5 can be done through any usual deposition process employed in the optical field, such as vacuum deposition, spin coating, brush coating, dip coating etc. . . . Of course, the deposition process will depend on the nature of the coating layer or layers deposited on the surface of the flexible mold part 5.

Thereafter the supporting elements 3, 7 are moved relatively to each other to bring into contact coating 6 and UV curable glue drop 4 and a pressure is exerted to the external surface of the mold part opposite to the coating in such a manner that the UV curable glue drop will spread on the surface 2 of the lens blank 1 and on the coating 6. However, the exerted pressure shall only be sufficient for spreading the drop of glue in order to obtain the required thickness for the final cured glue film but insufficient to impart any deformation to the lens blank 1.

As shown in FIG. 1B, the assembly formed by the lens blank 1, the glue film 4, the coating 6 and the mold part 5 is then placed into a device for UV curing the glue film 4. After curing of the UV film 4, the mold part 5 is withdrawn and a blank 1 having a coating 6 adhered onto its concave surface 2 is recovered as shown in FIG. 1C.

Figure 2A:
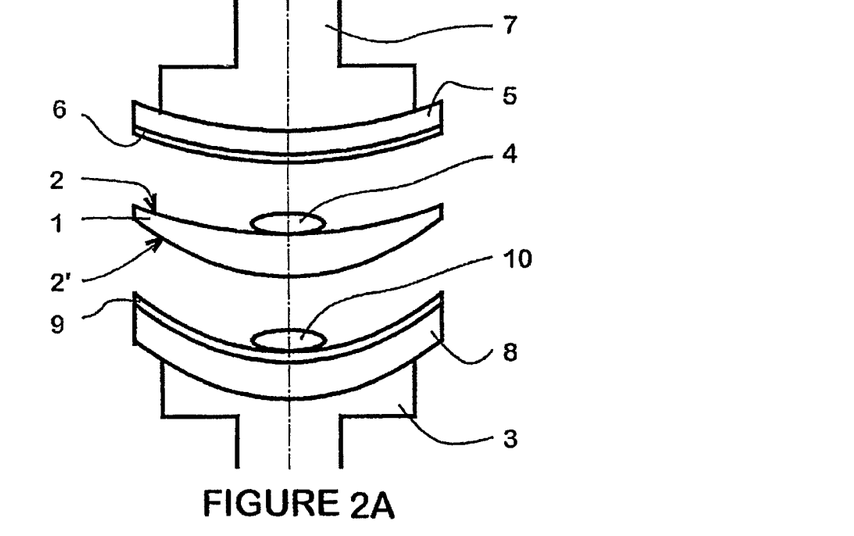
FIGS. 2A to 2C are schematic views of the main steps of a second embodiment of a process for transferring a coating onto an optical surface of a lens blank wherein coatings are simultaneously transferred to both optical surfaces of a lens blank.
Figure 2B:
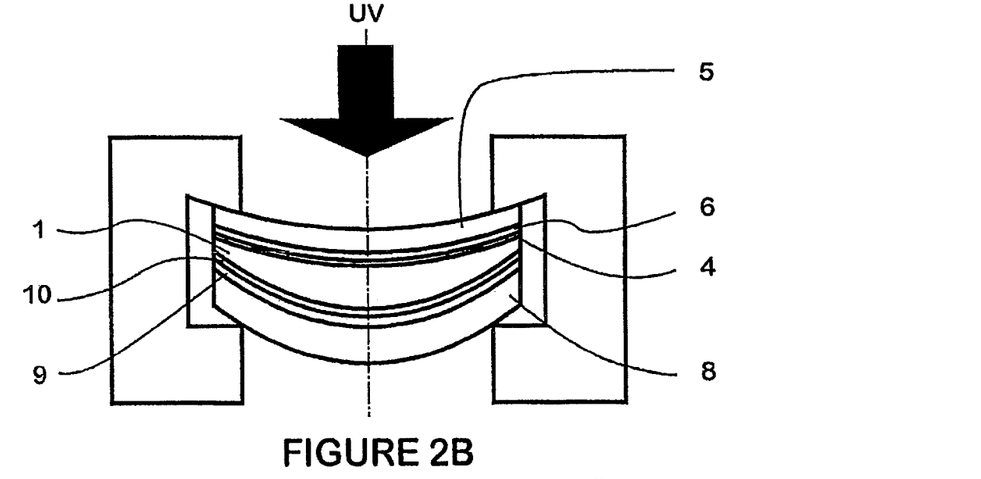
Figure 2C:
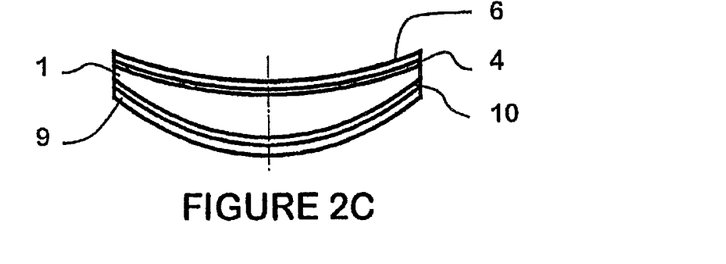

Referring now to FIGS. 2A to 2C, there is shown a similar process as described in connection with FIGS. 1A to 1B but in which both surfaces of lens blank 1 are coated with a coating by the transfer method of the invention.

As shown in FIG. 2A, a flexible mold part 8, for example a mold part made of polycarbonate having a thickness of 1 mm, whose concave surface has been previously coated with an optical coating 9 is placed onto a supporting element 3. A pre-measured drop 10 of a UV curable glue is then deposited onto coating 9. A lens blank 1 is then placed on mold part 8 with its convex surface 2' in contact with glue drop 10. A pre-measured UV curable glue drop is then deposited on concave surface 2 of lens blank 1. A flexible mold part 5, for example a polycarbonate mold part of 1 mm thickness, whose convex surface has been previously coated with an optical coating 6 is placed on a supporting element 7. Supporting elements 3, 7 are then moved relatively to each other to bring coating 6 into contact with glue drop 4 and a pressure is exerted on at least the external surface of one of the mold part to spread the glue drops 4 and 10 to form glue films. As indicated previously, the pressure exerted must only be sufficient to spread the glue drops and form glue films of required thicknesses after curing but insufficient to create any deformation in the lens blank 1.

Thereafter, the assembly formed by the mold parts, optical coatings, glue films and lens blank is placed into a UV curing device where the glue films 4, 10 are UV cured.

After completion of curing of the glue films, mold parts 5 and 8 are withdrawn and a finished lens having optical coatings 5, 6 adhered to both surfaces of the lens blank 1 is recovered, as shown in FIG. 2C.

Figure 3A:
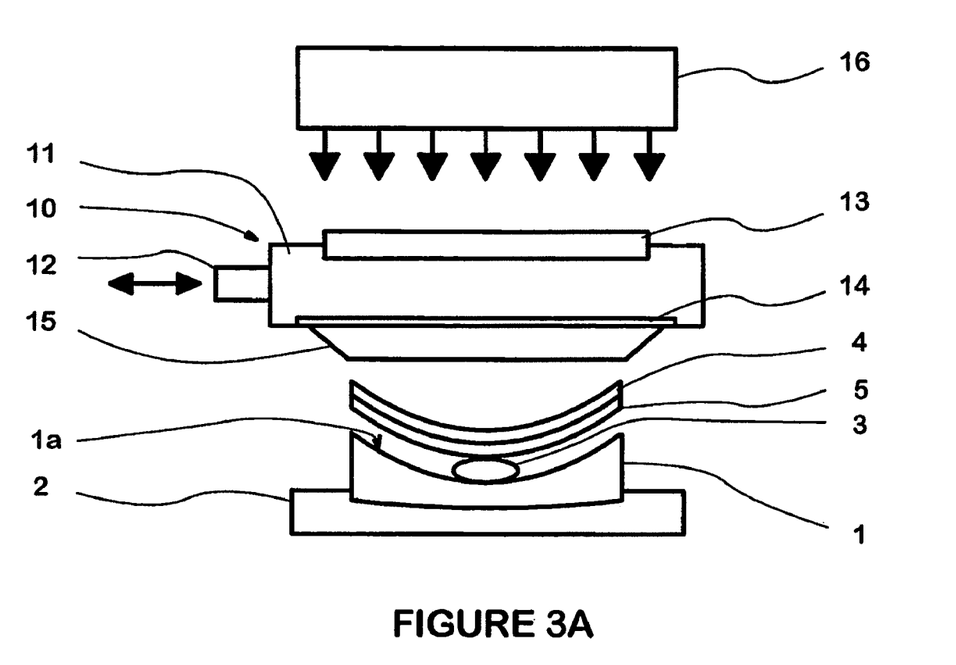
FIGS. 3A and 3B are schematic views of the main steps of a third embodiment of a process for transferring a coating onto an optical surface of a lens blank using a new inflatable membrane apparatus according to the invention.
Figure 3B:
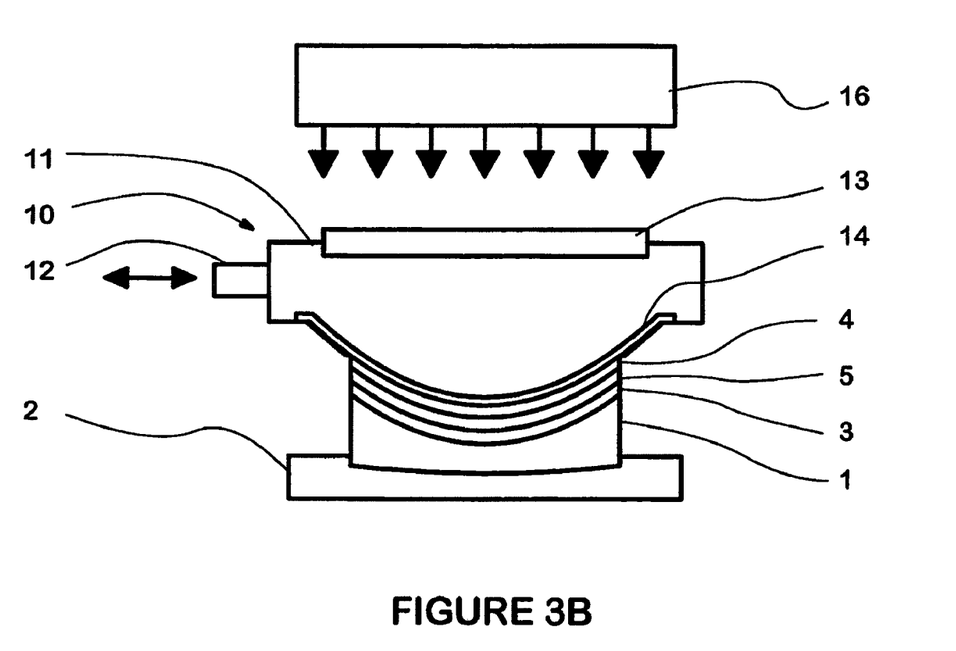

FIGS. 3A and 3B are schematic views of a third embodiment of the process of the invention in which the transfer of the coating is performed using a flexible mold part or carrier which is urged against the lens blank surface using an inflatable membrane apparatus according to the invention.

FIG. 3A shows the lens blank, flexible carrier and inflatable membrane before pressurization and inflation of the membrane, whereas FIG. 3B shows the same after pressurization and inflatation of the membrane.

Although, the following description will be made in connection with UV curing of the adhesive, similar apparatus and process can be used using a thermally curable adhesive.

Referring to FIG. 3A, a lens blank 1, for example a toric lens blank is placed in a lens blank support with its geometrically defined surface 1a facing outwardly.

A drop of liquid transparent adhesive 3 is deposited at the center of the geometrically defined surface 1a of the lens blank 1.

A thin flexible carrier 4, for example a spherical carrier, having a tansferable coating 5 deposited on one of its faces, is placed on the adhesive drop 3 so that the transferable coating 5 is in contact with the adhesive drop 3. The base curvature of the flexible carrier 4 is slightly higher than the base curvature of the geometrically defined surface 1a of lens blank 1.

The whole assembly is placed in front of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid from the accumulator. The upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 3A, the apparatus 10 further comprises a guiding means 15 for laterally guiding the inflatable membrane 14 during inflation thereof. More specifically, this guiding means comprises a trunconical part or funnel 15 projecting outwardly from the lower face of the accumulator 10 and whose greater base is obturated by the inflatable membrane and whose smaller base is a circular opening having a diameter at least equal to the base diameter of the flexible carrier 4 but preferably slightly larger (up to 5 mm larger . . . ).

Typically, the funnel height will range from 10 to 50 mm, preferably 10 to 25 mm, and will have a taper of 10 to 90°, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the adhesive drop 3 and the flexible carrier 4 is placed so that the rim of the flexible carrier 4 be within the plan of the rim of the smaller base opening of funnel 15 or separated therefrom by a distance up to 50 mm, preferably up to 20 mm.

As shown in FIG. 3B, a pressurized fluid, such as pressurized air, is introduced into the accumulator 11 from an external source (not represented) through entrance 12. The pressure increase within the accumulator, inflates the inflatable membrane 14 and, thanks to the membrane guiding means 15, the membrane 14 uniformly urges the flexible carrier against the lens blank 1, while uniformly spreading the adhesive 3.

The adhesive is then UV-cured.

After completion of the curing step, the lens blank 1 is disassembled from the holder 2 and the flexible carrier 4 is removed to recover a lens blank 1 whose geometrically defined surface 1a bears the transferred coating 5.

Of course, in case of a thermal curing process, light source and transparent portion of the upper face of the accumulator are not needed.

In this case also, the inflatable membrane needs not to be transparent. Otherwise, the apparatus remains the same.

Using the funnel type of apparatus just described, a good coating transfer is obtained, with good optical quality meeting the America Optical Laboratory Standard (ANSI Z80.1-1987) as far as the power, cylinder, prism and distortion are concerned.

The membrane guiding means (funnel) is very important to let the membrane expand in good shape and direction for applying an even pressure on the flexible carrier through the lens blank without any extra pressure on the carrier and lens blank edges.

The following examples illustrate the process of the present invention.

Adhesion Test

Dry adhesion test was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream to remove any dust formed during scribing, clear cellophane tape was then applied over the crosshatch pattern, pressed down firmly, and then rapidly pulled away from coating in direction perpendicular to the coating surface. Application and removal of fresh tape was then repeated two additional times. The lens was then submitted to tinting to determine the percentage adhesion, with tinted areas signifying adhesion failures.

EXAMPLES

Examples 1 to 6

HMC coatings comprising a hydrophobic top coating layer, an anti-reflection layer, an anti-abrasive coating and an impact and/or adhesion enhancing layer as specified above are deposited on the convex surface of different flexible carriers and were transferred to geometrically defined backside surfaces of lenses using the process and apparatus as defined in connection with FIGS. 3A and 3B.

The materials used, apparatus and process conditions are defined hereinunder:
1) Flexible mold part (carrier):
    Polycarbonate (thickness 0.5 mm)
    base curvature (BC) 6, 8 or 11,
    diameter of the flexible mold part (periphery) 68 mm.
2) Lenses:
    CR39®, peripheral diameter 70 mm, lenses, backsides with base curvatures as indicated in table III below,
    power as indicated in table III below.
3) Liquid adhesive:
UV curable liquid adhesive: OP-21 from DYMAX Corporation.
4) Inflatable membrane apparatus:
    Membrane: transparent silicone rubber membrane 1.6 mm thick, durometer hardness 40 A, tensile strength 5516 kPa and elongation 250%,
    Air pressure: pressure applied to the mold part 10 psi.
5) UV-cure
    light intensity 145 mW/Cu$^2$;
    cure time: 40 seconds.
Results are given in Table I:

Example 7

Examples 1 to 6 are reproduced except polycarbonate lenses were used instead of CR-39 lenses with powers varying from −2.00 to +2.00. The optical and HMC film qualities of the obtained lenses after the coating transfer were the same as in examples 1 to 6.

Example 8

Examples 1 to 6 are reproduced except photochromic lenses were used instead of CR-39 lenses. The optical and HMC film qualities of the obtained lenses after the coating transfer were the same as in examples 1 to 6.

Examples 9 to 18 and Comparative Examples 1 to 2

The procedure of examples 1 to 6 was repeated with the following conditions: thin PC carriers of:
a) HMC thin carrier preparation: firstly, different size and base curvature carriers having a thickness of 0.5 mm were prepared by surfacing PC blanks as shown in the following table IV. The PC carrier is made by non-UV absorber PC materials. The peripheral diameter of the carrier is 68 mm. These carriers were then coated by protective coating, AR coating, hard coating and latex primer coating to make a HMC front-coated carrier for backside coating transferring process.
b) Lens blank preparation: HMC front coated PC SF (semi-finished) lenses with peripheral diameter of 70 mm were back-surfaced to the different powers with different backside base curvatures or base as shown in the same table.
c) BST: the lenses were washed by soap and water and dried and then a small amount of UV acrylic adhesive were dropped on the backside of the lens and the HMC carrier was placed upon the glue. After that, the UV funnel type

TABLE I

Optical properties comparison before and after HMC film transfer onto different curved lenses from thin HMC-PC carriers (0.50 mm)

| Ex. | Lens power | Cylinder | BL or BLR-BLr | BC | Lens Power before BST | Lens Power After BST | Cylinder before BST | Cylinder after BST | Prism before BST | Prism after BST | Overall ISO Performance Z80.1 |
|---|---|---|---|---|---|---|---|---|---|---|---|
| 1 | (+) 4.00 | 0 | 5.40<br>5.40 | 6 | 4.01 | 3.93 | −0.04 | −0.09 | 0.63 | 0.64 | Good |
| 2 | (+) 3.00 | −2 | 5.70<br>7.70 | 8 | 3.02 | 3.03 | −1.98 | −2.02 | 0.21 | 0.46 | Good |
| 3 | (+) 1.00 | −2 | 6.20<br>8.20 | 8 | 0.97 | 1.02 | −1.93 | −1.94 | 0.14 | 0.05 | Good |
| 4 | (−) 1.00 | −2 | 6.60<br>8.50 | 8 | −1.01 | −1.02 | −2.05 | −2.05 | 0.12 | 0.02 | Good |
| 5 | (−) 3.00 | 0 | 7.70<br>7.70 | 8 | −2.99 | −2.94 | −0.03 | −0.05 | 0.37 | 0.31 | Good |
| 6 | (−) 4.00 | −2 | 8.50<br>10.50 | 11 | −4.06 | −4.04 | −1.93 | −1.99 | 0.86 | 0.30 | Good |

BST: Backside transfer.

accumulator apparatus was placed on top of the carrier. The membrane was inflated at a constant pressure of 69 kPa to deform the HMC carrier and spread out the glue liquid to match the backside curvature of the lens, and then a UV light was irradiated from the top (carrier side) for 40 seconds. After UV curing, the lens with HMC carrier stack was edged to remove excess glue on the edge and then the carrier was blown off by air to leave HMC stacked on the backside of the lens. The optical quality and distortion of the obtained lenses with HMC on the backside by BST process was checked by HUMPHERY 350 Power.

The results are given in Table II:

TABLE II

| Ex. | PC lens power | Cylinder of PC lens | BL BLR ≈ BLr | BC/HMC Carrier base | Power before BST | Power after BST | Cylinder before BST | Cylinder after BST | Optical distortion after BST |
|---|---|---|---|---|---|---|---|---|---|
| 9 | +2.00 | 0 | 3.6 | 4.1 | +2.04 | +2.02 | 0.04 | 0.06 | Good |
| 10 | +2.00 | 2.00 | 3.6 ≈ 5.5 | 5.5 | +2.04 | +2.11 | 1.99 | 2.05 | Good |
| 11 | +1.00 | 0 | 4.5 | 5.5 | +0.99 | +0.94 | 0.03 | 0.01 | Good |
| 12 | +1.00 | 2.00 | 4.5 ≈ 6.3 | 6.1 | +1.02 | +1.06 | 1.98 | 1.94 | Good |
| 13 | −1.00 | 0 | 5.2 | 5.7 | −0.98 | −1.00 | 0.02 | 0.07 | Good |
| 14 | −1.00 | 2.00 | 5.2 ≈ 7.0 | 7.5 | −1.02 | −0.92 | 1.96 | 2.03 | Good |
| 15 | −2.00 | 0 | 5.1 | 6.1 | −2.05 | −1.95 | 0.02 | 0.05 | Good |
| 16 | −2.00 | 2.00 | 5.1 ≈ 6.9 | 6.5 | −2.00 | −1.93 | 1.99 | 2.01 | Good |
| 17 | −3.00 | 0 | 6.0 | 6.5 | −2.92 | −2.95 | 0.02 | 0.04 | Good |
| 18 | −3.00 | 2.00 | 6.0 ≈ 7.8 | 7.5 | −2.90 | −3.03 | 2.02 | 1.96 | Good |
| Comp. 1 | +1.00 | 2.00 | 4.5 ≈ 6.3 | 4.5 | +1.05 | 2.03 | 2.03 | 3.07 | NG |
| Comp. 2 | 0.00 | 0 | 5.5 | 4.5 | 0.00 | 1.00 | 0.00 | 0.45 | NG |

Comp. 1-2: The carrier base curvature was smaller than the lens back base curvature;
NG: Not good.

HMC pre-coating of the mold parts of the above examples was as follows, except in example 5 wherein no hard coat and no primer coat is used.

HMC front coated PC SF in examples 19 to 28 are obtained following step 2 and 3 of HMC deposition but with the deposition of each layer being performed in the reverse order (primer/hardcoat/AR layers) i.e. normal order.

Step 1: Protecting and Releasing Coating

The composition of the protecting and releasing coating was as follows in Table III:

TABLE III

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC mold parts are cleaned using soap water and dried with compressed air. The mold part convex surfaces are then coated with the above protecting coating composition via spin coating with application speed of 600 rpm for 3 seconds and dry speed of 1200 rpm for 6 seconds. The coating was cured using Fusion System H+ bulb at a rate of 1.524 m/minute (5 feet per minute).

Step 2: Anti-Reflection (AR) Coating

The PC mold parts after deposition of the protecting coating was vacuum coated as follows:

A/ Standard Vacuum AR Treatment: The Vacuum AR treatment is accomplished in a standard box coater using well known vacuum evaporation practices. The following is one procedure for obtaining the VAR on the mold:

1. The molds having the protective coating already applied on the surface, are loaded into a standard box coater and the chamber is pumped to a high vacuum level.

2. Hydrophobic coating (Chemical=Shin Etsu KP801M) is deposited onto the surface of the molds using a thermal evaporation technique, to a thickness in the range of 2-15 nm.

3. The dielectric multilayer AR coating, consisting of a stack of sublayers of high and low index materials is then deposited, in reverse of the normal order. Details of this deposition are as such:

The optical thicknesses of the alternating low and high index layers are presented in Table IV:

TABLE IV

| Low index | 103-162 nm |
|---|---|
| High index | 124-190 nm |
| Low index | 19-37 nm |
| High index | 37-74 nm |

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a laquer hard-coating which will be deposited on the coated mold at a later time.

Step 3: Hard Coat (HC) & Latex Primer Coating

The composition of the hardcoating was as follows in Table V:

TABLE V

| Component | Parts by weight |
|---|---|
| Glymo | 21.42 |
| 0.1N HCl | 4.89 |
| Colloidal silica | 30.50 |
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the primer was as follows in Table VI:

TABLE VI

| Component | Parts by weight |
|---|---|
| Polyurethane latex W-234 | 35.0 |
| Deionized water | 50.0 |

TABLE VI-continued

| Component | Parts by weight |
|---|---|
| 2-Butoxy ethanol | 15.0 |
| Coupling agent | 5.00 |

The PC mold parts after deposition of protecting coating and AR coating in Steps 1 and 2 are then spin coated by HC solution at 600 rpm/1200 rpm, and precured 10 minutes at 80° C., and again spin coated by latex primer solution at the same speed and postcuring for 1 hour at 80° C.

The coupling agent is a precondensed solution of as follows in Table VII:

TABLE VII

| Component | Parts by weight |
|---|---|
| GLYMO (Glycidoxypropyltrimethoxysilane) | 10 |
| Acryloxypropyltrimethoxysilane | 10 |
| 0.1N HCl | 0.5 |
| Aluminium acetylacetonate | 0.5 |
| Diacetone alcohol | 1.0 |

The invention claimed is:

1. An inflatable membrane apparatus for transferring a transferable coating onto a lens blank, the apparatus comprising:
   a fluid accumulator having an upper and a lower face and a fluid entrance, said lower face being partly formed by an inflatable membrane;
   a trunconical part projecting outwardly from the lower face of the accumulator, wherein the greater base of the trunconical part is closed by the lower face, and wherein the smaller base of the trunconical part forms a circular opening; and
   a flexible carrier for receiving the transferable coating thereon and configured to be disposed between the inflatable membrane and the lens blank;
   where the inflatable membrane apparatus is configured such that, as pressurized fluid is introduced into the accumulator, deformation of the inflatable membrane is guided by the trunconical part to urge the transferable coating against the lens blank.

2. The inflatable membrane apparatus of claim 1, wherein the height of the trunconical part is between 10 mm and 50 mm.

3. The inflatable membrane apparatus of claim 1, wherein the taper of the trunconical part is between 10° and 90°.

4. The inflatable membrane apparatus of claim 1, wherein at least a portion of the inflatable membrane and at least a portion of the upper face of the accumulator is transparent.

5. A process for transferring a coating from a flexible carrier and onto a geometrically defined surface of a lens blank, the process comprising:
   depositing an amount of curable glue on at least one of said geometrically defined surface and said coating;
   placing the lens blank and the flexible carrier in front of an inflatable membrane of an inflatable membrane apparatus comprising:
      a fluid accumulator having an upper and a lower face and a fluid entrance, said lower face being partly formed by the inflatable membrane; and
      a trunconical part projecting outwardly from the lower face of the accumulator, wherein the greater base of the trunconical part is closed by the lower face, and wherein the smaller base of the trunconical part forms a circular opening; and
   introducing fluid into the accumulator such that the inflatable membrane urges the flexible carrier against the lens blank, thereby coupling the coating and the geometrically defined surface via the glue, where deformation of the inflatable membrane is guided by the trunconical part.

6. The process of claim 5, wherein the flexible carrier comprises a polycarbonate material.

7. The process of claim 5, wherein the flexible carrier has a thickness of between 0.3 mm and 5.0 mm.

8. The process of claim 5, wherein the geometrically defined surface of the lens blank comprises an optical surface.

9. The process of claim 5, wherein the geometrically defined surface of the lens blank has a root mean square roughness (Sq) of between $10^{-3}$ micrometers and 1 micrometer.

10. The process of claim 5, comprising:
   curing the glue;
   wherein the thickness of the glue after curing is less than 100 micrometers.

11. The process of claim 5, wherein a pressure applied by the inflatable membrane to the flexible carrier is between 5 psi and 50 psi.

12. The process of claim 5, wherein the coating comprises at least one of the following: an anti-reflection coating layer, an anti-abrasion coating layer, an impact resistant coating layer, a photochromic coating layer, a dyeing coating layer, a polarized coating layer, and a printed layer.

13. The process of claim 12, wherein the coating has a thickness of less than 50 micrometers.

14. The process of claim 5, wherein the lens blank comprises a semi-finished lens including a coating.

15. The process of claim 5, wherein the geometrically defined surface of the lens blank comprises a spherical surface, and the base curvature of the flexible carrier (BC) and the base curvature of the spherical surface (BL) fulfill the following relationships:

$$0<BC-BL<1.5.$$

16. The process of claim 5, wherein the geometrically defined surface of the lens blank comprises a toric surface, and the base curvature of the flexible carrier (BC) and the base curvatures of the toric surface (BLR, BLr) fulfill the following relationships:

$$BLR<BLr \text{ and}$$

a) if $BLr-BLR \leq 3.5$, then $0<BC-BLR<3$ and $|BC-BLr|<1$, or
   b) if $BLr-BLR>3.5$, then $BLR<BC<BLr$.

17. A process for transferring a coating from a flexible carrier and onto a geometrically defined surface of a lens blank, the process comprising:
   placing the lens blank and the flexible carrier in front of an inflatable membrane of an inflatable membrane apparatus comprising:
      a fluid accumulator having an upper and a lower face and a fluid entrance, said lower face being partly formed by the inflatable membrane; and
      a trunconical part projecting outwardly from the lower face of the accumulator, wherein the greater base of the trunconical part is closed by the lower face, and wherein the smaller base of the trunconical part forms a circular opening; and introducing fluid into the accumulator such that the inflatable membrane urges the flexible carrier against the lens blank, thereby transferring the coating from the flexible carrier and onto the geometrically defined surface of the lens blank, where deformation of the inflatable membrane is guided by the trunconical part.

18. The inflatable membrane apparatus of claim 1, wherein, without pressurized fluid within the accumulator, said inflatable membrane is flat.

19. The inflatable membrane apparatus of claim 1, wherein the inflatable membrane is configured to extend through the circular opening of the smaller base of the trunconical part when the fluid accumulator is pressurized.

20. The inflatable membrane apparatus of claim 1, wherein the flexible carrier is separable from the inflatable membrane.

* * * * *